United States Patent
Miyake

(10) Patent No.: US 6,333,685 B1
(45) Date of Patent: Dec. 25, 2001

(54) APPARATUS FOR DETECTING SUBMERGENCE OF VEHICLE

(75) Inventor: Ryoji Miyake, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/599,723

(22) Filed: Jun. 23, 2000

(30) Foreign Application Priority Data

Jun. 24, 1999 (JP) .................................................. 11-178651

(51) Int. Cl.$^7$ ...................................................... B60Q 1/00
(52) U.S. Cl. ...................... 340/425.5; 340/850; 340/852; 340/603; 701/45; 701/46; 701/47
(58) Field of Search .................................... 340/850, 852, 340/603, 604, 605, 425.5; 701/45, 46, 47

(56) References Cited

U.S. PATENT DOCUMENTS

| | | | | |
|---|---|---|---|---|
| 4,068,221 | * | 1/1978 | McClintock | 340/421 |
| 5,408,221 | * | 4/1995 | Carsella, Sr. et al. | 340/604 |
| 5,897,369 | * | 4/1999 | Jun | 438/629 |

FOREIGN PATENT DOCUMENTS 20-264149 * 9/2000 (JP) .
00-318445 * 11/2000 (JP) .

* cited by examiner

Primary Examiner—Jeffery Hofsass
Assistant Examiner—Daniel Previl
(74) Attorney, Agent, or Firm—Sughrue Mion, PLLC

(57) ABSTRACT

A submergence detection portion 21 is provided in a circuit substrate, or the like, which carries electronic circuits of a power window control portion. The submergence detection portion 21 is configured to have an elliptical hole portion 25 provided in the circuit substrate so as to be immersed in water in case of submergence of a vehicle, and electrically conductive patterns 26 and 27 provided in the circuit substrate so as to be opposite to each other with respect to the hole portion 25. End portions of the electrically conductive patterns 26 and 27 near to the hole portion 25 are formed as electrically conductive pads 26a and 27a made of electrically conductive portions exposed. When the hole portion 25 is filled with water in case of submergence, the electrically conductive patterns 26 and 27 are electrically connected to each other. One of the electrically conductive patterns 26 and 27 is connected to a ground wiring pattern whereas the other is connected to a detection signal output circuit which outputs a submergence detection signal when the electrically conductive patterns 26 and 27 are electrically connected to each other.

5 Claims, 1 Drawing Sheet

APPARATUS FOR DETECTING SUBMERGENCE OF VEHICLE

BACKGROUND OF INVENTION

1. Technical Field

The present invention relates to a vehicle submergence detection apparatus for detecting submergence of a vehicle.

2. Related Art

A power window mechanism for opening/closing a pane of window glass by using a motor, or the like, has been generally set up in a vehicle such as a car in recent years. When a vehicle has such a power window mechanism, providing various submergence countermeasures to submergence in a sea, a lake, or the like, due to an unforeseen accident., or the like, has been discussed. A submergence countermeasure enables a crew member to escape out of the vehicle easily when the vehicle has been submerged, by opening a pane of window glass automatically, or securely opening the pane of window glass by a manual operation.

Such a submergence countermeasure uses a structure which has a submergence detection means for detecting a submergence state, a control circuit for controlling a movement, and a drive circuit for supplying driving electric power to a motor, or the like, to drive a pane of window glass to open/close the window. The structure enables the pane of window glass to compulsorily open or to securely open by operating an emergency backup circuit when submergence is detected.

In the above-mentioned submergence countermeasure, no technique for detecting submergence has ever been established sufficiently. In the background art, a special sensor unit having a light transmitter and a light receiver for detecting water invasion optically is used for detecting submergence. However, when using such a special sensor unit, there was a problem that the cost of the submergence countermeasure substantially increased, or that a large space was required for arranging the special sensor unit.

SUMMARY OF THE INVENTION

The present invention has been attained upon the aforementioned circumstances and has as its object the provision of a vehicle submergence detection apparatus which is inexpensive and simple in configuration and in which submergence can be detected.

According to the present invention, there is provided an apparatus for detecting submergence of a vehicle, including: a hole portion provided in a substrate carrying electronic circuits in the vehicle so that the hole portion is immersed in water in case the vehicle is submerged; first and second electrically conductive patterns disposed so as to be opposite to each other with respect to the hole portion; and a detection output means connected to either of the first and second electrically conductive patterns so that the detection output means outputs a submergence detection signal on the basis of current conduction between the first and second electrically conductive patterns.

Preferably, the detection output means includes a semiconductor switching device which gets in an ON state when current conduction is performed between the first and second electrically conductive patterns.

In the aforementioned configuration, when the vehicle has been submerged, the hole portion is filled with water so that the first and second electrically conductive patterns opposite to each other with respect to the hole portion are electrically connected to each other. By the current conduction between the first and second electrically conductive patterns, the detection output means outputs a submergence detection signal. For example, when the electrically conductive patterns are electrically connected to each other, a semiconductor switching device gets in an ON state in the detection output means so that an output of the semiconductor switching device is issued as a submergence detection signal. Hence, submergence of the vehicle can be detected by a simple and inexpensive configuration which is such that only a hole portion and electrically conductive patterns are provided in a circuit substrate.

DESCRIPTION OF PREFERRED EMBODIMENT

An embodiment of the present invention will be described below with reference to the drawings.

Figure 1:
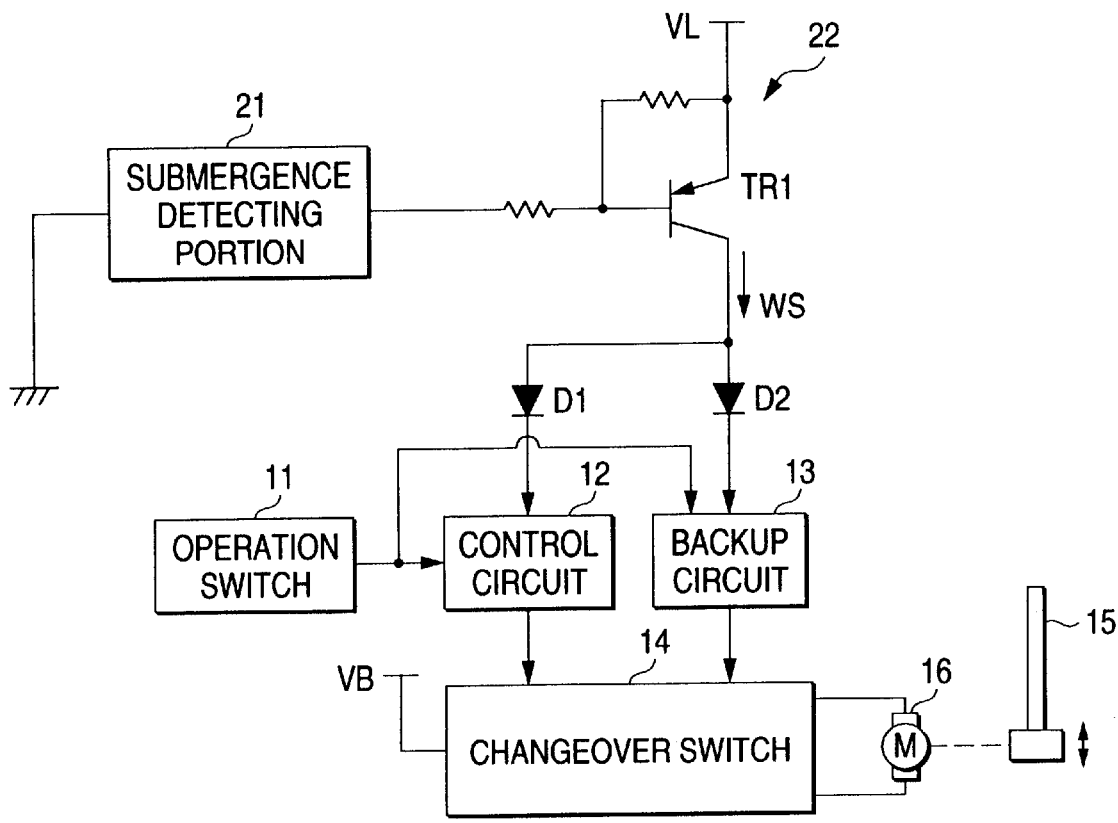
FIG. 1 is a block diagram showing the configuration of a power window control portion of a vehicle including a submergence detection apparatus according to an embodiment of the present invention.
Figure 2:
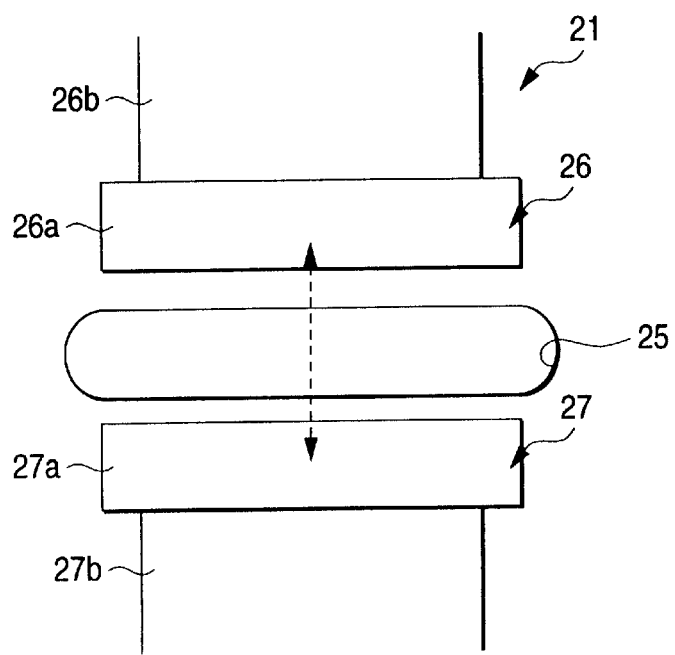
FIG. 2 is an explanatory diagram showing the configuration of a submergence detection portion according to the embodiment of the present invention.

FIG. 1 is a block diagram showing the structure of a power window control portion of a vehicle including a submergence detection apparatus according to an embodiment of the present invention. FIG. 2 is an explanatory diagram showing an example of the configuration of a submergence detection portion according to the embodiment of the present invention. In this embodiment, there is shown an example of the structure in which the submergence detection apparatus is provided in or near a power window control unit in a door portion of the vehicle.

A changeover circuit 14 is provided at the power control portion, which includes an operating switch 11, a control circuit 12 including a control processor, etc., a backup circuit 13 for operating in case of submergence, and a changeover circuit containing a relay, etc. In an ordinary state, an instruction signal is applied into the control circuit 12 by crew member's operation of the operating switch 11. The control circuit 12 outputs a control signal to the changeover circuit 14 for driving a pane of window glass 15, the control signal is output based on the instruction signal or another input signal. The changeover circuit 14 switches driving electric power based on a battery voltage VB and supplies the driving electric power to a drive motor 16 suitably. The drive motor 16 is rotated by the driving electric power to move up/down the pane of window glass 15 to open/close the window.

The power window control portion includes a submergence detection portion 21 and a detection signal output circuit 22. The submergence detection portion 21 detects a submergence state, the detection signal output circuit 22 corresponds to a detection output means for outputting a submergence detection signal WS when detecting a submergence state. As will be described later in detail, the submergence detection portion 21 has a structure that two terminals are electrically connected to each other when the vehicle is submerged. A first terminal is connected to the ground, a second terminal is connected to the detection signal output circuit 22. The detection signal output circuit 22 has a structure including a transistor TR1 as a semiconductor switching device. The transistor TR1 has a base connected to the second terminal of the submergence detection portion 21, an emitter supplied with a control system source voltage VL, and a collector connected to the control circuit 12 and the backup circuit 13 via diodes D1 and D2 respectively.

The submergence detection portion 21 is provided in a circuit substrate carrying electronic circuits of the power window control portion or provided in another circuit substrate. As shown in FIG. 2, the submergence detection portion 21 includes an elliptical hole portion 25 formed in the circuit substrate, and electrically conductive patterns 26 and 27 provided so as to be opposite to each other with respect to the hole portion 25. End portions of the electrically conductive patterns 26 and 27 near the hole portion 25 are formed as electrically conductive pads 26a and 27a, respectively, in which electrically conductive portions are exposed by being plated with solder without providing an insulation protection resist layer. Other portions than the end portions of the electrically conductive patterns 26 and 27 are formed as electrically insulated patterns in which an insulation protection resist layer is provided. One of the electrically conductive patterns 26 and 27 is connected to a ground wiring pattern while the other is connected to the detection signal output circuit 22. Incidentally, the shapes of the hole portion 25 and the electrically conductive patterns 26 and 27 are not limited to the example shown in FIG. 2. Various modified shapes may be used as long as the same function can be obtained.

The operation in this embodiment will be described below. When the vehicle is submerged, water such as fresh water or salt water invades the vehicle so that the submergence detection portion 21 is immersed in water. Hence, the hole portion 25 of the submergence detection portion 21 is filled with the invading water, so that a leakage current flows between the electrically conductive patterns 26 and 27 to bring a current-conduction state. By the current conduction between the electrically conductive patterns 26 and 27, the base potential of the transistor TR1 of the detection signal output circuit 22 gets a low level near to the ground level, so that the transistor TR1 is switched on. As a result, the ON-state current of the transistor TR1 is sent as a submergence detection signal WS to the control circuit 12 and the backup circuit 13.

When the submergence detection signal WS is received, the control circuit 12 performs an emergency operation when there is submergence. For example, the control circuit 12 controls the changeover circuit 14 to drive the pane of window glass 15 to move down to thereby open the pane of window glass 15 automatically so that the crew member can escape from the window. Incidentally, the backup circuit 13 and the changeover circuit 14 are waterproofed by waterproof coating, or the like, so that they can operate for at least several minutes after they have got in a submergence state. That is, the pane of window glass 15 can be driven by the operation of the backup circuit 13 even when the control circuit 12 becomes inoperable because of submergence. For example, even in a submergence state, crew member's operation on the operating switch 11 permits the backup circuit 13 to operate the changeover circuit 14 to move down the pane of window glass 15.

As described above, according to this embodiment, submergence of a vehicle can be detected by a simple and inexpensive configuration which is such that only a hole portion and electrically conductive patterns are provided in a circuit substrate. Moreover, it is unnecessary to provide any special sensor unit for detecting waster invasion optically, so that a submergence state can be detected with a small arrangement space and a low cost. Hence, a submergence countermeasure can be set up inexpensively and easily.

As described above, according to the present invention, an apparatus for detecting submergence of a vehicle includes: a hole portion provided in a substrate carrying electronic circuits in the vehicle so that the hole portion is immersed in water when the vehicle is submerged; first and second electrically conductive patterns disposed so as to be opposite to each other with respect to the hole portion; and a detection output means connected to either of the first and second electrically conductive patterns so that the detection output means outputs a submergence detection signal on the basis of current conduction between the first and second electrically conductive patterns. Hence, there is an effect that a vehicle submergence detection apparatus can be provided so that submergence of a vehicle can be detected by an inexpensive and simple configuration of the apparatus.

What is claimed is:

1. An apparatus for detecting submergence of a vehicle including a substrate carrying electric circuits, comprising:
   a hole portion provided at said substrate, said hole portion immersed in water when said vehicle is submerged;
   first and second electrically conductive patterns disposed so as to be opposite to each other with respect to said hole portion; and
   a detection output device,
      wherein at least one of said first and second electrically conductive patterns is electrically connected to said detection output device, and
      wherein said detection output device outputs a submergence detection signal on the basis of current conduction between said first and second electrically conductive patterns.

2. The apparatus for detecting submergence of a vehicle according to claim 1, wherein said detection output device includes a semiconductor switching device which operates in an ON state when said current conduction is performed.

3. An apparatus for detecting submergence of a vehicle, comprising:
   a substrate carrying electronic circuits in said vehicle;
   a first electrically conductive pattern provided at said substrate;
   a second electrically conductive pattern provided at said substrate and being separated from said first electrically conductive pattern; and
   a hole portion provided at said substrate and located between said first and second electrically conductive patterns,
      wherein said first electrically conductive pattern is electrically connected to said second electrically conductive pattern when said hole portion is immersed in water.

4. The apparatus for detecting submergence of a vehicle according to claim 3 further comprising:
   a detection output device electrically connected to at least one of said first and second electrically conductive patterns,
      wherein said detection output device outputs a submergence detection signal when said first electrically conductive pattern is electrically connected to said second electrically conductive pattern.

5. The apparatus for detecting submergence of a vehicle according to claim 4, wherein said detection output device includes a semiconductor switching device which operates in an ON state when said first electrically conductive pattern is electrically connected to said second electrically conductive pattern.

* * * * *